(12) United States Patent
Cheung et al.

(10) Patent No.: US 8,945,020 B2
(45) Date of Patent: Feb. 3, 2015

(54) ZERO HEAT FLUX SENSOR AND METHOD OF USE

(75) Inventors: Amy Oi Mee Cheung, Eindhoven (NL); Jasper Klewer, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 683 days.

(21) Appl. No.: 13/144,701

(22) PCT Filed: Dec. 23, 2009

(86) PCT No.: PCT/IB2009/055949
§ 371 (c)(1),
(2), (4) Date: Jul. 15, 2011

(87) PCT Pub. No.: WO2010/082102
PCT Pub. Date: Jul. 22, 2010

(65) Prior Publication Data
US 2011/0264001 A1    Oct. 27, 2011

Related U.S. Application Data

(60) Provisional application No. 61/145,605, filed on Jan. 19, 2009.

(51) Int. Cl.
*A61B 5/00* (2006.01)
*G01K 1/14* (2006.01)
(Continued)

(52) U.S. Cl.
CPC .. *G01K 1/14* (2013.01); *G01K 1/16* (2013.01); *G01K 1/165* (2013.01); *G01K 7/21* (2013.01); *G01K 13/002* (2013.01)
USPC .......................................................... 600/549

(58) Field of Classification Search
CPC ................... G01K 1/165; A61B 19/54; A61B 2010/0012; A61B 5/01; A61B 7/08
USPC .................................... 600/549, 574; 374/163
See application file for complete search history.

(56) References Cited

U.S. PATENT DOCUMENTS 3,099,162 A   7/1963   Imperial et al.
4,300,392 A   11/1981  Bloomer et al.
(Continued)

FOREIGN PATENT DOCUMENTS

CN   2177230 Y   9/1994
CN   2663959 Y   12/2004
(Continued)

OTHER PUBLICATIONS

Togawa et al., "A modified internal temperature measurement device.", Medical and Biological Engineering May 1976, pp. 361-364.*

(Continued)

*Primary Examiner* — Max Hindenburg
*Assistant Examiner* — Renee Danega

(57) ABSTRACT

When measuring core body temperature in a patient, a curved sensor (10) is provide that has a predefined radius of curvature to fit comfortably and closely to a patient's forehead. The sensor (10) has at least one releasable securing strip (e.g., Velcro™) that couples the sensor (10) to a headband (14), as well as an adhesive strip (16) that is positioned along one edge of an interior surface of the sensor (10) and couples the sensor (10) to the patient's skin. The adhesive strip acts as a hinge that facilitates inspection of the skin beneath the sensor without complete removal of the sensor, and the headband and curvature of the sensor provide a snug fit of the interior surface of the sensor against the patient's skin. Additionally, the sensor may be a zero heat flux sensor (34) with a heater (32) placed on one side thereof and a thermister (36) placed on an opposite side thereof, between the heat flux sensor (34) and a patient's skin. The heater is adjusted until heat flux through the heat flux sensor is zero, at which point the patient's skin surface temperature (as detected by the thermistor) is recorded as a core body temperature. Moreover, the thermister (34, 72) may be quickly calibrated by linearizing a temperature vs. resistance curve therefore, and shifting the linearized curve to a predetermined 15 reference curve.

14 Claims, 4 Drawing Sheets

(51) Int. Cl.
*G01K 1/16* (2006.01)
*G01K 7/21* (2006.01)
*G01K 13/00* (2006.01)

(56) References Cited

U.S. PATENT DOCUMENTS

| | | | |
|---|---|---|---|
| 5,043,692 A * | 8/1991 | Sites et al. | 338/28 |
| 5,116,136 A | 5/1992 | Newman et al. | |
| 5,803,915 A | 9/1998 | Kremenchugsky et al. | |
| 5,816,706 A | 10/1998 | Heikkila et al. | |
| 5,818,956 A | 10/1998 | Tuli | |
| 6,029,272 A * | 2/2000 | Bazin | 2/12 |
| 6,275,996 B1 | 8/2001 | Redwood et al. | |
| 2002/0150143 A1 | 10/2002 | Tokita et al. | |
| 2002/0191675 A1 | 12/2002 | Tokita et al. | |
| 2003/0032893 A1 | 2/2003 | Koch | |
| 2004/0076215 A1* | 4/2004 | Baumbach | 374/29 |
| 2007/0055171 A1* | 3/2007 | Fraden | 600/549 |
| 2007/0167753 A1 | 7/2007 | Van Wyk et al. | |

FOREIGN PATENT DOCUMENTS

| | | |
|---|---|---|
| DE | 229487 A | 11/1985 |
| DE | 20012083 U1 | 9/2000 |
| DE | 20318882 U1 | 4/2004 |
| JP | S52116976 U | 9/1977 |
| JP | S63157630 U | 10/1988 |
| JP | 05072053 A | 3/1993 |
| JP | 2002372464 A | 12/2002 |
| JP | 2005261464 A | 9/2005 |
| WO | 2008110948 A2 | 9/2008 |

OTHER PUBLICATIONS

Zeiner et al. "Non-Invasive Continuous Cerebral Temperature Monitoring in Patients Treated with Mild Therapeutic Hypothermia: An Observational Pilot Study."Resuscitation 81 (2010) 861-866.*

Yamakage et al., "Deep temperature monitoring using a zero-heat-flow method.", J Anesth (2003) 17:108-115.*

* cited by examiner

ZERO HEAT FLUX SENSOR AND METHOD OF USE

CROSS REFERENCE TO RELATED APPLICATIONS

This application claims the benefit of U.S. provisional application serial no. 61/145,605 filed Jan. 19, 2009, which is incorporated herein by reference.

The present application finds particular utility in medical patient temperature sensing systems. However, it will be appreciated that the described technique(s) may also find application in other types of temperature sensing systems, heat flux sensing systems, and/or other medical or industrial applications.

Reliable and accurate body temperature monitoring is of high importance in the clinical environment, both in high-acuity and in low-acuity settings. However, body temperature sensors that are currently available and that provide accurate readings are highly invasive (arterial line catheters, esophageal/rectal probes, etc.), while the non-invasive sensors have very poor measurement accuracy. Accordingly, temperature sensors are underutilized, and a large population of patients is not properly temperature-monitored.

One of the most crucial factors in obtaining an accurate core body temperature measurement is good skin contact. Any air pockets between the skin and sensor will result in unreliable readings. Classical zero-heat flow sensors have a flat configuration, and due to the electrical insulation tape used to conform to defibrillation requirements, such sensors are rather rigid. Normally, double sided medical grade adhesive is used to fix the sensor to the skin. In many circumstances, the patient will be moved, e.g. to change bed sheets, etc., and so the adhesive plays an important role in keeping the sensor attached to the forehead during any movements that may affect the sensor position. Due to the rigidity of the sensor, using adhesive only is insufficient to ensure that the whole sensor is in good contact with the skin, as the corners of the flat sensors are susceptible to becoming detached from the skin on a curved patient surface, such as a forehead. A headband can be used to apply additional pressure to the sensors to reduce this effect; however the problem still exists. Moreover, constant pressure applied to the forehead can become uncomfortable and may result in pressure wounds. Furthermore, due to the length of time the sensor is attached to the skin (e.g., 36 hours or more), it is desirable to inspect the skin under the sensor every few hours to check if there are any allergic skin reactions or pressure wounds caused by the sensor and headband. However, with adhesive, this can be inconvenient since once the sensor is peeled from the skin, the adhesive strength is reduced and the measurement is disrupted.

When using two or more thermistors to measure heat flux in a temperature sensor, accurate calibration of each thermistor is critical to determining when there is no heat flux flowing from the body to the surface, as well as for lateral heat loss compensation. Due to the resistance tolerance of off-the-shelf thermistors, individual calibration of each thermistor is typically required in order to accurately determine when zero heat flux has been reached. Individual calibration of thermistors is not only time consuming, but additional bookkeeping is required to account for the thermistor coefficients of each individual thermistor, especially if the sensor consists of multiple thermistors.

Off-the-shelf thermistors typically have a resistance tolerance of 5%, which translates to approximately 1° C. interchangeability for a 10 kΩ thermistor. However, an accuracy of approximately 0.3° C. is called for. Therefore, in the clinical setting, the thermistor resistance tolerance is too inaccurate. To achieve the required accuracy, the thermistors are individually calibrated with an accurate calibration set-up. Individually calibrating thermistors is time consuming as the resistances of several temperature points are needed (e.g., a minimum of 10-15 points chosen in the range from 25° C. to 45° C.—the likely use case range).

There is an unmet need in the art for systems and methods that facilitate rapid, economical, and accurate patient core body temperature measurement, thereby overcoming the deficiencies noted above.

In accordance with one aspect, a system for monitoring a patient's core body temperature includes a curved temperature sensor, at least one releasably securing strip an outer surface of the sensor, a band that is coupled to the sensor by the at least one releasably securing strip and that secures the sensor to the patient, and an adhesive strip positioned along one edge of the interior side of the sensor that couples the interior side of the sensor to the skin of the patient.

In accordance with another aspect, a system for measuring core body temperature in a patient includes a heater to which current is applied to generate heat, a heat flux sensor below the heater, and a thermistor positioned between the heat flux sensor and the skin of the patient that has a resistance that is inversely variable with skin temperature. The system further includes a printed circuit board (PCB) comprising electronic circuitry that adjusts the current to the heater until a voltage across the heat flux sensor is zero, at which point the temperature at the skin of the patient is recorded as the core body temperature by the circuitry on the PCB.

In accordance with another aspect, a system for reducing calibration requirements in a patient temperature sensor includes a thermistor with a resistance that is inversely variable with patient body temperature, a linearizing resistor that is coupled to the thermistor in parallel, and a curve-shifting resistor coupled in series with the thermistor and the linearizing resistor.

In accordance with another aspect, a method of monitoring core body temperature in a patient includes applying an at least partially adhesive temperature sensor with a thermistor to the patient's forehead, and securing the temperature sensor to the patient's forehead using an adhesive strip and a removable headband.

One advantage is that core body temperature is measured inexpensively and accurately.

Another advantage resides in reducing patient skin irritation in the area of the sensor.

Another advantage resides in increasing ease of skin inspection beneath the sensor.

Another advantage resides in reducing a number of calibration points required to calibrate a sensor.

Another advantage resides in reducing a number of thermistors to obtain an accurate core body temperature reading.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

Figure 2:
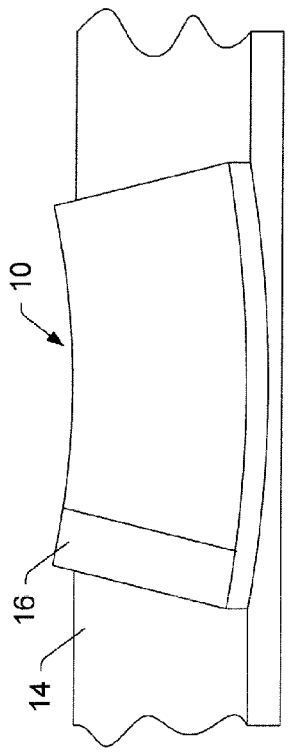
FIG. 2 illustrates the sensor attached to a headband by the securing strips (FIG. 1).
Figure 1:
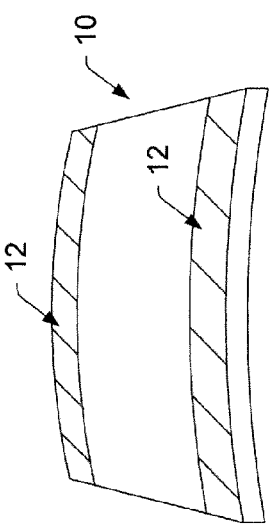
FIG. 1 illustrates a curved temperature sensor that is pre-bent to introduce a slight curvature to the sensor, thereby reducing the pressure needed to be applied by a headband when attaching the sensor to a patient.

FIGS. 1 and 2 illustrate a curved temperature sensor 10 that is pre-bent to introduce a slight curvature to the sensor, thereby reducing the pressure applied by a headband 14 when attaching the sensor to a patient. In addition, the sensor 10 is attached to a headband using securing strips 12 (e.g., Velcro™ hook and loop or hook and loop fabric, or some other suitable fastening means) to eliminate the possibility of the headband slipping off of the forehead. In one embodiment, two of the strips 12 are securely adhered to the top side of the sensor to further reinforce the curvature. Furthermore, the sensor is only partially covered by adhesive 16 on the patient side in order to enable medical staff the possibility of lifting a portion of the sensor to view the skin underneath without causing a significant interruption to the measurement. It will be appreciated that the adhesive strip or tape 16 may be positioned on any desired edge of the sensor 10. By reducing the surface area of the adhesive strip 16, skin irritation is reduced and skin inspection is facilitated relative to conventional adhesives that cover the entire sensor. According to an example, the adhesive strip 16 covers approximately 5% to approximately 20% of the skin-side surface of the sensor 10. In another example, the adhesive strip 16 covers approximately 10% of the skin-side surface of the sensor 10.

Figure 3:
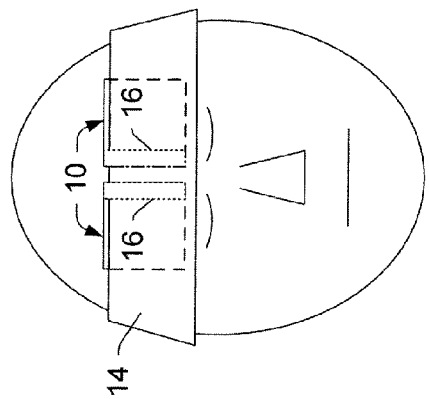
FIG. 3 illustrates a pair of sensors attached to the forehead of a patient by the adhesive strips, and further held in place by the headband.

In one embodiment, two curved sensors 10 are attached to a headband to monitor patient temperature. In this case, the adhesive strip 16 may be placed on the top or bottom skin-side edge of each sensor, or on the interior skin-side edges (relative to each other, as shown in FIG. 3) to facilitate skin inspection without removing the sensors.

In another embodiment, the sensor 10 is assembled on an arced jig or surface, and layers thereof are coupled together (e.g., using mechanical fasteners, chemical fasteners or epoxies, stitching, or the like) so that they each have a predetermined radius of curvature, as does the finished sensor. The predetermined radius of curvature is selected to be consistent with an average radius of curvature of a human forehead. In one embodiment, the radius of curvature is in the range of approximately 8 cm to approximately 15 cm. In another embodiment, the radius of curvature is smaller to accommodate a pediatric patient.

FIG. 2 illustrates the sensor 10 attached to the headband 14 by the securing strips 12 (FIG. 1). The sensor is pre-bent (e.g., during fabrication or at some other time prior to affixation to the patient) with a slight curvature and fixed in place using the strip of adhesive or tape 16 (e.g., electrically insulating tape or the like) on the bottom side (the patient side) of the sensor. The curved configuration conforms better to the forehead and reduces the effects of detachment at the corners of the sensor. Not only do securing strips help keep the pre-bent shape, but they also facilitate attachment of the sensor 10 to the headband 14.

In one embodiment, double-sided medical grade adhesive tape is attached to the bottom side (the patient skin side) of the sensor. The adhesive strip 16 is applied only at one side of the sensor, and thereby acts as a hinge to allow medical staff easy access to the skin underneath the sensor. For instance, if a nurse or physician desires to check the skin beneath the sensor, the headband is unfastened and the sensor is gently lifted while remaining attached to the patient's forehead by the adhesive strip 16. In this manner, the patient's skin can be checked for pressure wounds or the like while ensuring that the sensor is properly repositioned when the headband is re-secured.

In this manner, a minimal amount of adhesive 16 is employed to hold the sensor 10 in a desired position on the patient's forehead while reducing skin irritation and increasing ease of skin inspection. The headband 14 provides sufficient pressure to the sensor to ensure good contact with the patient's skin to improve measurement accuracy. In one embodiment, a gel material is applied between the skin and the sensor to further facilitate achieving a good thermal contact surface and reducing skin irritation.

FIG. 3 illustrates a pair of sensors 10 attached to the forehead of a patient by the adhesive strips 16, and further held in place by the headband 14. If a nurse of physician removes the headband, the strip of double sided medical grade adhesive ensures that the sensors remain attached to the forehead while providing the possibility to lift the sensor from the skin for inspection. Subsequently, the measurement can be resumed with minimal disturbance to the sensor measurement.

Figure 4:
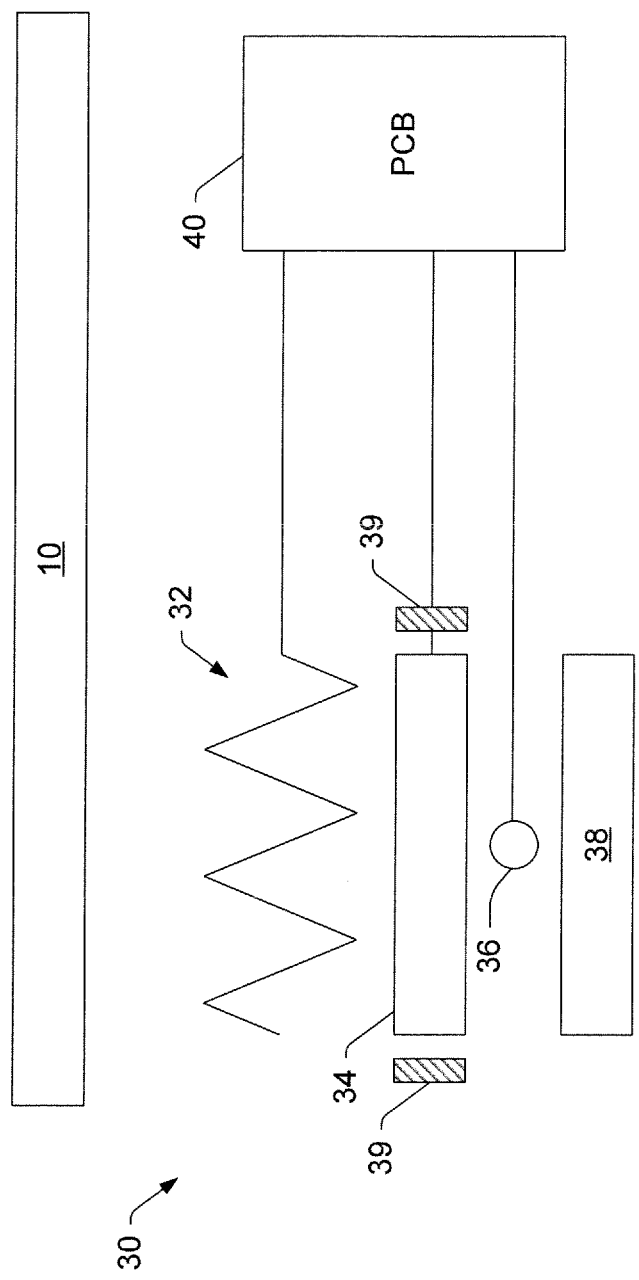
FIG. 4 illustrates an example of a layered arrangement for a temperature sensing system, which comprises a heating element, a heat flux sensor and a thermistor to measure the core body temperature of a subject or patient.

FIG. 4 illustrates an example of a layered arrangement for a temperature sensing system 30, which comprises a heating element 32, a heat flux sensor 34 and a thermistor 36 to measure the core body temperature of a subject or patient. The system 30 may be employed on an inner surface of or partially embedded in the sensor 10 of the preceding figures, or independently thereof. The heat flux sensor 34 produces a voltage proportional to the heat flux flowing there through. When there is no heat flux, a reference voltage (e.g., zero voltage) is generated or measured. By controlling current to the heater, located directly above the heat flux sensor, the heat flux sensor voltage can be driven to zero, resulting in no heat flow from the body to the atmosphere. Subsequently, the core body temperature is measured using the thermistor 36 placed at the skin 38 side of the sensor 34. The advantage of using a heat flux sensor rather than two thermistors to measure the heat differential is that the need for highly accurate calibration of thermistors is eliminated.

A heating element 39 (shown in cross-section, as hashed blocks) may also be positioned at the perimeter (e.g., lateral edges) of the heat flux sensor to act as a guard ring to reduce lateral heat losses. Due to the sensitivity of the heat flux sensor to heat flow, the electronics to measure the voltage from the heat flux sensor are mounted on a copper plated printed circuit board (PCB) 40 to ensure uniform temperature distribution is achieved as temperature gradients on the PCB are measured. Furthermore, the electronics may be shielded from any airflow due to the ambient to improve measurement accuracy.

The heat flux sensor 34 thus measures the amount of heat flux flowing from the body to the ambient air surrounding the sensor 34. The heater 32 is placed on top (e.g., on the non-patient side) of the heat flux sensor and controlled to ensure that no heat flux is flowing to the ambient (i.e., a zero voltage reading is measured). The thermistor 36 is placed below (e.g., on the patient side) the heat flux sensor at the skin 38 surface to provide a measure of the temperature at which zero heat flux occurs. This temperature is recorded as the core body temperature.

In one embodiment, the thermistor 36 is a 10 kΩ thermistor, although thermistors of other values may be employed with the described systems and methods, as will be appreciate by those of skill in the art.

It will be appreciated that the PCB 40 may include one or more processors or processing circuits that control the heater, monitor the heat flux sensor and/or the thermistor, and the like. Additionally, the PCB may include a memory component that stores data associated with performing the various functions described herein, as well as instructions for execution by the processor (s) in carrying out said functions. The PCB may be mounted remotely from the heater, heat flux sensor, and the thermistor, e.g., on an outer surface of the sensor 10 (e.g., the internal or skin-side surface).

Figure 5:
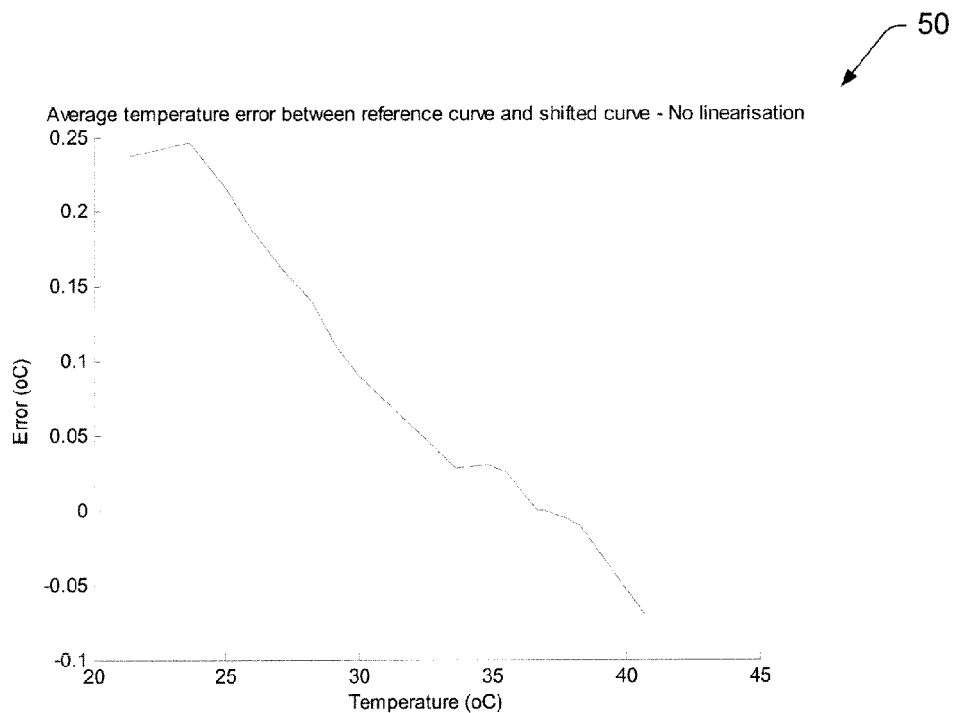
FIG. 5 is an illustration of a graph that shows average error in terms of degrees Celsius that are present after non-linearized resistance vs. temperature curves have been shifted using a series resistor.
Figure 6:
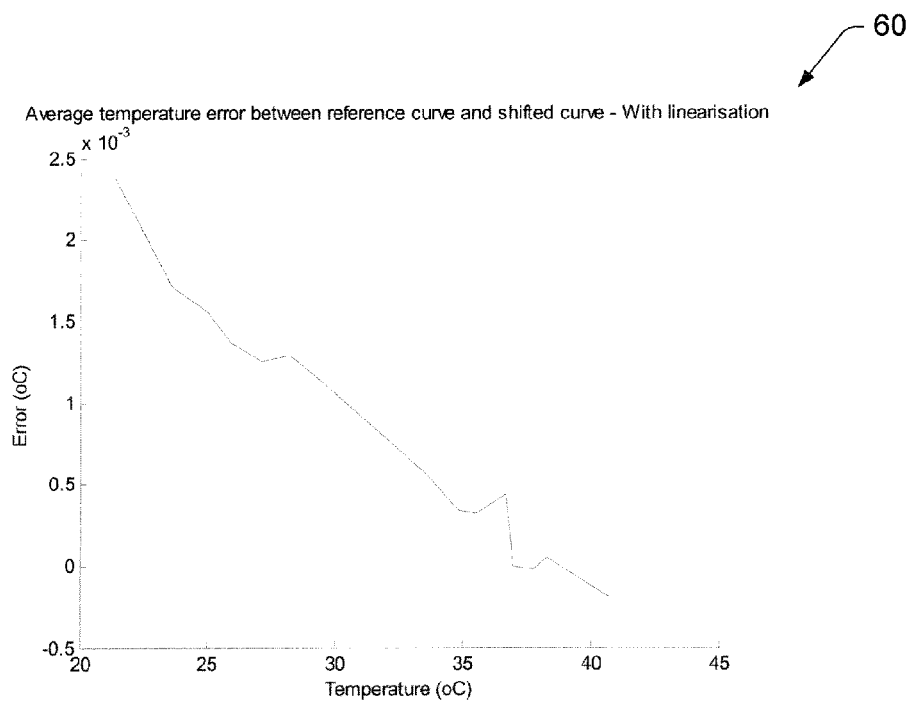
FIG. 6 is an illustration of a graph that shows that variability error between the resistance vs. temperature curve and the reference curve can be significantly reduced by first linearizing the curve by adding a resistor in parallel with the thermistor.
Figure 7:
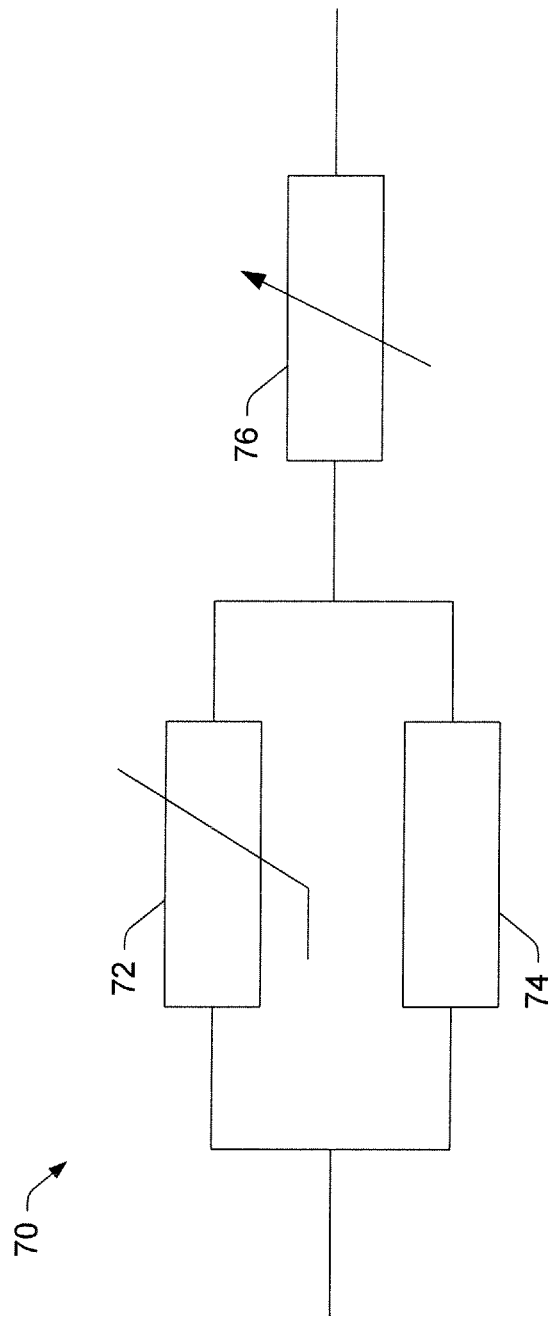
FIG. 7 illustrates a system that facilitates linearizing resistance versus temperature curve for a thermistor and shifting the linearized curve to a reference curve, in accordance with one or more aspects described herein.

FIGS. 5-7 illustrate an embodiment that simplifies the calibration of thermistors employed in zero flux temperature sensors. Thermistors of the same type or model typically have a variability of up to about 1° C. Therefore, for accuracies higher than 1° C., each thermistor typically has to be individually calibrated in order to obtain accurately the complete resistance vs. temperature curve. By linearizing the resistance vs. temperature curve, the curves can then be shifted to a reference curve in order to equalize them, and this can be achieved using only one calibration point (down from approximately 15 calibration points per thermistor using conventional systems and methods, which take several hours to calibrate).

FIG. 5 is an illustration of a graph 50 that shows average error in terms of degrees Celsius between a reference curve and a shifted resistance vs. temperature curve without linearization. 37° C. is used as the reference temperature, and at this temperature point the error of the resistance vs. temperature curves from the reference is 0° C. However, errors begin to increase upon deviation from this temperature point. It is possible to shift the resistance versus temperature curve to a selected reference curve to try to equalize the curves by placing a resistor in series with the thermistor. However, due to the non-linear characteristics of the thermistors, variability errors from the shifted and reference curve begin to occur outside the chosen reference temperature.

FIG. 6 is an illustration of a graph 60 that shows that variability error between the reference curve and the shifted resistance vs. temperature can be significantly reduced by first linearizing the curve, such as by adding a resistor in parallel with the thermistor. Note that there are two orders of magnitude difference in the error in FIGS. 5 and 6. After linearization, the resistance vs. temperature curve can subsequently be shifted to a reference curve using a resistor added in series with the parallel configuration. The curves are aligned at the 37° C. point, and therefore only one calibration point is needed. FIG. 6 illustrates the error reduction that can be achieved, which is an improvement of two orders of magnitude compared to a scenario in which no linearization is employed (e.g., FIG. 5).

FIG. 7 illustrates a system 70 that facilitates linearizing resistance versus temperature curve for a thermistor and shifting the linearized curve to a reference curve, in accordance with one or more aspects described herein. The system 70 may be employed in one or both of the sensor 10 and the system 30 of FIGS. 1-4, or independently thereof. The system 70 includes a thermistor 72 arranged in a parallel configuration with a linearizing resistor 74. A shifting resistor 76 is coupled to the parallel configuration of the linearizing resistor and thermistor. Selecting a low resistance value for the parallel linearizing resistor 74 results in a lower variability of error; however, as a consequence, there is a decrease to the total resistance and hence a decrease in sensitivity. Choosing a higher thermistor resistance value can reduce or offset this effect. The curve shifting resistor 76 placed in series is a variable resistor that is adjusted until the error achieved at the 37° C. point is 0.

In one example, the thermistor has a value of approximately 10 kΩ, the linearizing resistor has a value of approximately 3 kΩ, and the curve-shifting resistor has a value of approximately 0-1 kΩ. However, those of skill will appreciate that the foregoing values are illustrative in nature and that the described systems and methods are not limited thereto.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system for monitoring a patient's core body temperature, including:
   a curved temperature sensor;
   at least one releasably securing strip an outer surface of the sensor;
   a band that is coupled to the sensor by the at least one releasably securing strip and that is configured to secure the sensor to the patient; and
   an adhesive strip positioned along one edge of the interior side of the sensor that is configured to couple the interior side of the sensor to the skin of the patient;
   wherein a longitudinal edge of the adhesive strip is aligned with a first edge of the interior surface of the sensor such that the sensor is configured to pivot about the adhesive strip as the sensor is lifted.

2. The system according to claim 1, wherein the adhesive strip covers less than or equal to 20% of the surface area interior side of the sensor.

3. The system according to claim 1, wherein the adhesive strip includes one or more of a double-sided medical grade adhesive tape and an electrically insulating tape.

4. The system according to claim 1, further including:
   a heater to which current is applied to generate heat;
   a heat flux sensor below the heater;
   a thermistor configured to be positioned between the heat flux sensor and the skin of the patient that has a resistance that is inversely variable with skin temperature; and
   a printed circuit board (PCB) comprising electronic circuitry configured to adjust the current to the heater until a voltage across the heat flux sensor is zero, at which point the temperature at the skin of the patient is recorded as the core body temperature by the circuitry on the PCB, which is configured to record the temperature.

5. The system according to claim 1, further including:
   a thermistor with a resistance that is inversely variable with patient body temperature;
   a linearizing resistor that is coupled to the thermistor in parallel; and
   a curve-shifting resistor coupled in series with the thermistor and the linearizing resistor.

6. The system according to claim 1, wherein the parallel configuration of the linearizing resistor is sonfigured to reduce the total resistance of the thermistor and linearizing resistor, thereby linearizing variability error between a resistance vs. temperature curve of the thermistor and a reference curve.

7. The system according to claim 1, wherein the sensor has a radius of curvature in the range of 8 cm to 15 cm.

8. A system for measuring core body temperature in a patient, including:
   a heater to which current is applied to generate heat;
   a heat flux sensor below the heater;
   a thermistor configured to be positioned between the heat flux sensor and the skin of the patient that has a resistance that is inversely variable with skin temperature; and
   a printed circuit board comprising electronic circuitry that is adapted to adjust the current to the heater until a voltage across the heat flux sensor is zero, at which point the temperature at the skin of the patient is recorded as the core body temperature by the circuitry on the PCB, which is configured to record the temperature.

9. The system according to claim 8, further including:
   a heating element that surrounds a perimeter of the heat flux sensor and is configured to reduce lateral heat loss therefrom.

10. The system according to claim 8, wherein the PCB is a copper plated PCB that has even heat distribution characteristics.

11. The system according to claim 8, further including:
   a linearizing resistor that is coupled to the thermistor in parallel; and
   a curve-shifting resistor coupled in series with the thermistor and the linearizing resistor.

12. The system according to claim 8, further comprising a stack of elements arranged in the following order, the stack including:
   a headband that is adapted to be positioned about the patient's head;
   a temperature sensor;
   the heater;
   the heat flux sensor; and
   the thermistor;
   wherein the thermistor is positioned on the patient at the bottom of the stack.

13. A system for reducing calibration requirements in a patient temperature sensor, including:
   a thermistor with a resistance that is inversely variable with patient body temperature;
   a linearizing resistor that is coupled to the thermistor in parallel; and
   a curve-shifting resistor coupled in series with the thermistor and the linearizing resistor;
   wherein the sensor comprises a stack of elements arranged in the following order:
   a headband that is adapted to be positioned about the patient's head;
   a temperature sensor;
   the heater;
   the heat flux sensor; and
   the thermistor;
   wherein the thermistor is positioned on the patient at the bottom of the stack.

14. The system of claim 13, wherein the parallel configuration of the linearizing resistor is configured to reduce the total resistance of the thermistor and linearizing resistor, thereby linearizing variability error between a resistance vs. temperature curve of the thermistor and a reference curve.

* * * * *